US007487920B2

(12) United States Patent
Sato et al.

(10) Patent No.: US 7,487,920 B2
(45) Date of Patent: Feb. 10, 2009

(54) INTEGRATED CIRCUIT CARD SYSTEM AND APPLICATION LOADING METHOD

(75) Inventors: Akiko Sato, Musashino (JP); Yusuke Mishina, Kunitachi (JP); Masanori Oikawa, Koganei (JP)

(73) Assignee: Hitachi, Ltd., Tokyo (JP)

( * ) Notice: Subject to any disclaimer, the term of this patent is extended or adjusted under 35 U.S.C. 154(b) by 623 days.

(21) Appl. No.: 10/869,891

(22) Filed: Jun. 18, 2004

(65) Prior Publication Data

US 2005/0137737 A1 Jun. 23, 2005

(30) Foreign Application Priority Data

Dec. 19, 2003 (JP) ............................. 2003-421961

(51) Int. Cl.
*G06K 19/06* (2006.01)
(52) U.S. Cl. ..................... 235/492; 235/380; 700/121
(58) Field of Classification Search ................. 235/376, 235/380, 382, 487, 492; 700/121; 705/41
See application file for complete search history.

(56) References Cited

U.S. PATENT DOCUMENTS

| 5,889,941 | A * | 3/1999 | Tushie et al. ................ 726/26 |
| 6,402,028 | B1 * | 6/2002 | Graham et al. ............... 235/380 |
| 6,481,632 | B2 * | 11/2002 | Wentker et al. .............. 235/492 |
| 6,612,486 | B2 * | 9/2003 | Sato et al. ................... 235/375 |
| 2002/0050528 | A1 * | 5/2002 | Everett et al. ............... 235/492 |

OTHER PUBLICATIONS

"GlobalPlatform—Advancing Standards for Smart Card Growth", GlobalPlatform Systems Profiles Specification, (Sep. 24, 2003). Copyright 2003 GlobalPlatform, Inc., pp. i-viii, and 1-145.
GlobalPlatform, Inc., "Card Configurator and Script Builder Specification" Version 2.0.2, Nov. 2000, pp. i-v and 1-84.
Office Action from European Patent Office dated May 24, 2006.
"A primer to the Implementation of Smart Card Management and Related Systems", Version 1.0, GlobalPlatform, Aug. 2000, pp. 1-47.

* cited by examiner

*Primary Examiner*—Seung H Lee
(74) *Attorney, Agent, or Firm*—Reed Smith LLP; Juan Carlos A. Marquez, Esq.

(57) ABSTRACT

An integrated circuit card operation management system and method are provided. In one example of the system, a collator system is provided for receiving a user request to determine whether the application program can be loaded, for acquiring a card policy from a card issue management system, and for acquiring an application program policy from a service provider management system. The collator system requests card related information of the card issue management system and requests application program related information of the service provider management system. The collator system specifies a definition format. The card issue management system and the service provider management system extract requested information from existent information, convert the requested information according to the specified definition format, and transmit the converted information to the collator system. Using the acquired policies and the acquired profiles, the collator system determines whether the application program can be loaded.

10 Claims, 13 Drawing Sheets

CARD POLICY TRANSMISSION PROCESSING
(CARD ISSUE MANAGEMENT SYSTEM)

AP POLICY TRANSMISSION PROCESSING
(SERVICE PROVIDER MANAGEMENT SYSTEM)

FIG. 11

POLICY EXAMPLE

```xml
<?xml version="1.0" encoding="Shift-JIS"?>
<PolicyGroup>
    <Policy Process="AP_LOAD">
        <Description> SHOWS CARD POLICY IN LOADING AP </Description>
        <ObjStatement obj="o1"/>
        <Object Name="o1" Type="AP" Base="DTD1">
            <Description> SHOWS CONSTRAINT ON AP </Description>
            <Statement>
                <And>
                    <Statement cond="c1"/>
                    <Statement cond="c2"/>
                </And>
            </Statement>
            <Cond-Group>
                <Condition
                        Name="c1"
                        Ref="/ApplicationProfile/ApplicationInfo/@NonVolatileDataSpaceMin"
                        Rule="LESS_EQ"
                        Multi="ALL">
                    <Value Type="DECIMAL" IsRef="FALSE"> 4000 </Value>
                </Condition>
                <Condition
                        Name="c2"
                        Ref="/ApplicationProfile/ApplicationInfo/@Subtype"
                        Rule="EQUAL"
                        Multi="ALL">
                    <Value Type="STRING" IsRef="FALSE"> APP </Value>
                </Condition>
            </Cond-Group>
        </Object>
    </Policy>
</PolicyGroup>
```

FIG. 12

PROFILE EXAMPLE

```xml
<?xml version="1.0" encoding="UTF-8"?>
<ApplicationProfile>
    <ApplicationInfo
        Subtype="APP"
        VolatileDataSpaceMin="123"
        NonVolatileDataSpaceMin="4567"
        AppSpacificInstallParams="890ABCDEF"/>
</ApplicationProfile>
```

FIG. 13

DATA CONFIGURATION EXAMPLE IN DB

1301

| CARD ID | POLICY ID | CARD POLICY |
|---------|-----------|-------------|
| 0005 | 0AAA | <?xml version="1.0" encoding="Shift-JIS"?> ... |
| 0007 | 0AAB | <?xml version="1.0" encoding="Shift-JIS"?> ... |
| | | |

1302

| AID | POLICY ID | AP POLICY |
|-----|-----------|-----------|
| AA001 | 0AAA | <?xml version="1.0" encoding="Shift-JIS"?> ... |
| AA003 | 0AAB | <?xml version="1.0" encoding="Shift-JIS"?> ... |
| | | |

US 7,487,920 B2

INTEGRATED CIRCUIT CARD SYSTEM AND APPLICATION LOADING METHOD

CLAIM OF PRIORITY

The present invention claims priority from Japanese application JP2003-421961 filed on Dec. 19, 2003, the content of which is hereby incorporated by reference in its entirety.

BACKGROUND OF THE INVENTION

1. Field of the Invention

The present invention generally relates to an integrated circuit (IC) card system using an IC card and, more particularly, to a method of loading a card application program into an IC card and executing it.

2. Discussion of Background

Multifunction IC cards into which plural services can be loaded are increasingly replacing conventional type magnetic cards. A card issuer mainly manages a multifunction IC card. The card issuer often determines beforehand the application programs (APs) to be loaded into the IC card.

Regarding evaluating the combination of various cards and APs, a method involving a specification decision group related to an IC card of Global Platform (GP) is disclosed in GlobalPlatform Systems Profiles 1.1.0, published Sep. 2, 2003.

FIG. 1 shows a system configuration that automatically discriminates the right combination of an IC card and an AP in IC card management service proposed by GP. The outline of components of this conventional system is described below.

A card issue management system 101 manages information related to an IC card and the information of a card user and executes the card issue service. The card issue management system 101 manages a card issue management database (DB) 121. Card profile information 122 is managed in the corresponding DB. Card profile information 122 is attribute information related to the card. Card profile information 122 is a generic name for information used for the management of the card by the card issue management system 101. Card profile information 122 also includes basic data such as card identification (ID) and card capacity, as well as data that dynamically varies such as the list information of APs currently loaded into the card. Particularly, in this case, it is characteristic that data called card policy 123 is included. The card policy 123 is a requisite requested of another entity such as an AP by the card, for example, a requisite that the capacity of an AP shall be 4 KB or less and the type of the AP shall be an AP corresponding to Java®Card. The card policy is included in the card profile information 122. A card profile acquisition processor 124 is provided with logic for returning the corresponding card profile in response to a request from an external system.

A service provider management system 102 manages information related to the AP and the information of a service user and provides service. The service provider management system 102 manages a service provider management database 131, in which AP profile information 132 is managed. The AP profile information 132 is attribute information related to the AP. AP profile information 132 is a generic name for information used for the management of the AP by the service provider management system 102. The AP profile information 132 also includes basic data such as card identification (ID) and the name of the AP, as well as data that dynamically varies such as whether the AP is run or not. Like the card profile information 122, the AP profile information 132 includes an AP policy 133. The AP policy 133 is a requisite requested of another entity such as a card by the AP, for example, a requisite that the EEPROM capacity of the card shall be 16 KB or more and the platform of the card shall be Java®Card. An AP profile acquisition processor 134 is provided with logic for returning the corresponding AP profile in response to a request from an external system.

A collator system 103 is a system for collecting a profile in response to a request from a user 111 and for determining whether a policy included in the profile is met or not. The collator system 103 includes profile collection logic 141 and a policy determination processor 142. The profile collection logic 141 is provided with logic for requesting and acquiring card profile information 122 of the card issue management system 101 and requesting and acquiring AP profile information 132 of the service provider management system 102. The policy determination processor 142 includes logic for analyzing an acquired profile, for determining whether each policy is met or not, and for providing the result to the user.

The card issue management system 101, the service provider management system 102 and the collator system 103 exchange information via a network such as a public network, via a network including a common carrier leased line, or via mailing or handing a document and an information record medium. The terminal and the server of each system exchange information via a public network or via a network including a leased line.

Each of the above-mentioned systems is provided with a processor, but they are realized and operated as a computer program.

Next, the problem of a conventional type system will be described using the operational procedure of a process for determining whether the loading of an AP into an IC card is allowed in the above-mentioned system or not for an example.

When it is determined whether a desired AP can be loaded into a card 110 which the user 111 owns or not, the collator system is requested to determine whether the AP can be loaded or not (a step 151). For a concrete request method, there are Web access from a home PC, access from a terminal installed at a shop, and access via telephone inquiry. The collator system 103 acquires the corresponding card profile information 122 from the card issue management system 101 using the ID of the card owned by the user as a key (steps 152, 153). Similarly, the collator system 103 acquires the corresponding AP profile information from the service provider management system using application identification (AID) of the AP desired by the user as a key (steps 154, 155).

The collator system 103 verifies whether a card policy in the acquired card profile is met or not using information in the AP profile. For example, when the card policy is that the capacity of the AP shall be 4 KB or less, the collator system 103 checks an AP capacity item in the AP profile and determines whether the capacity is 4 KB or less or not. Similarly, the collator system verifies whether an AP policy in the AP profile is met or not by use of information in the card profile. When the AP policy is that the EEPROM capacity of the card shall be 16 KB or more, the collator system 103 checks an EEPROM capacity item in the card profile and determines whether the EEPROM capacity is 16 KB or more or not. The collator system 103 determines all policies and provides the result to the user (a step 156). Profile information including policies is represented in extensible markup language (XML).

If the types of IC cards increase, various APs are accordingly developed and can be provided. For versions are upgraded, loading may be impossible depending upon the combination of a card and an AP. Therefore, managing the combination of a loadable card and an AP becomes an intricate task for a card manager.

The AP can be loaded or deleted into/from a multifunction IC card after the card is issued to a user. It is assumed that the user freely selects the AP and repeatedly loads or deletes it. Therefore, it is estimated that it will be the essential service of a card issue manager to dynamically present which AP can be loaded to the user at real time.

A problem in a system proposed by a GP is that all items of profile information are required to be acquired.

The collator system acquires the information of all items defined as a profile because the contents of a policy are not known until the collator system receives a card policy included in a card profile and an AP policy included in an AP profile. Hereby, a problem related to security occurs. That is, every time a policy is determined, information unnecessary for determination is all provided to an external system. Besides, a problem in efficiency caused by differences in transmitted/received data capacity also occurs. When the policy of a whole IC card is determined in response to a request from a user, no large difference is made. However, when an IC card, the policy of which is to be determined, has large capacity and, accordingly, there are a large number of profiles for the collator to acquire, as in the case of a batch process, the data capacity of each profile information item is a large problem for efficiency of the system.

Another problem in the system proposed by the GP is that the format of profile information is fixed.

Profile information is information considered to be managed in the existent system, such as card ID, card capacity in the case of a card profile, AID, and the name of an AP in the case of an AP profile as described above. However, in a conventional type method, the format of each profile collected by the collator system 103 is required to be unified in the same format. Also, the card issue management system and the service provider management system are required to create a new DB or to create profile information according to the format beforehand. Creating a new DB has a problem of man-hours. Creating profile information requires creating profile information corresponding to the change of DB information at real time, which is difficult.

SUMMARY OF THE INVENTION

The objects of the present invention are to enable a card issue manager to dynamically present which application program (AP) can be loaded at real time, to enable the determination of a policy without the acquisition of all items of profile information by a collator, to minimize the quantity of data exchanged between systems, and to enable the collection of each profile without unifying the format of each profile collected by the collator system.

The following provides a summary of some embodiments of the present invention. In one example of the method, a request to load an application program into an IC card is received. A card policy which is requested of a card issue management system for application profile information and which is a condition for allowing the loading of the application program is requested and acquired of the card issue management system. An application policy which is requested of a service provider management system for the card profile information of the IC card and which is a condition for allowing the loading of the application program is requested and acquired of the service provider management system. Ann item of application profile information required for determining the card policy and a definition format specified by the card policy are specified and are requested of the service provider management system. The item of the application profile information is extracted from a service provider management database. The application profile information of the IC card converted according to the definition format is acquired. The item of the IC card profile information required for determining the application policy and a definition format specified by the application policy are specified and are requested of the card issue management system. The item of the IC card profile information is extracted from a card issue management database. The IC card profile information converted according to the definition format is acquired. The card policy is determined by the converted IC card profile information. The application policy is determined by the converted IC card application profile information. It is then determined whether the application program can be loaded into the IC card or not.

Hereby, the profile information provided to the external system by the card issue management system and the service provider management system can be made dynamic and minimally sized.

As only profile information required for determining a policy can be exchanged between the systems by a policy determination method provided by the invention, the disclosure of unnecessary profile information is prevented and security is thereby increased. In addition, as minimum data capacity is transmitted/received, efficiency is increased and cost is reduced.

Further, as a mapping rule is extracted in accordance with a format specified by a policy if a profile is provided and as the profile is dynamically created based upon an existing DB according to the rule, a profile format is not required to be the only fixed format. In addition, the existing DB can be utilized as it is. Accordingly, man-hours newly required in newly creating a table and other things can be reduced.

BRIEF DESCRIPTION OF THE DRAWINGS

The present invention will be readily understood by the following detailed description in conjunction with the accompanying drawings. To facilitate this description, like reference numerals designate like structural elements.

FIG. 11 shows an example notation of a policy, in accordance with an embodiment of the present invention;

FIG. 12 shows an example of the notation of a profile, in accordance with an embodiment of the present invention; and FIG. 13 shows an example of the DB structure for managing a policy, in accordance with an embodiment of the present invention.

DESCRIPTION OF THE PREFERRED EMBODIMENTS

Figure 1:
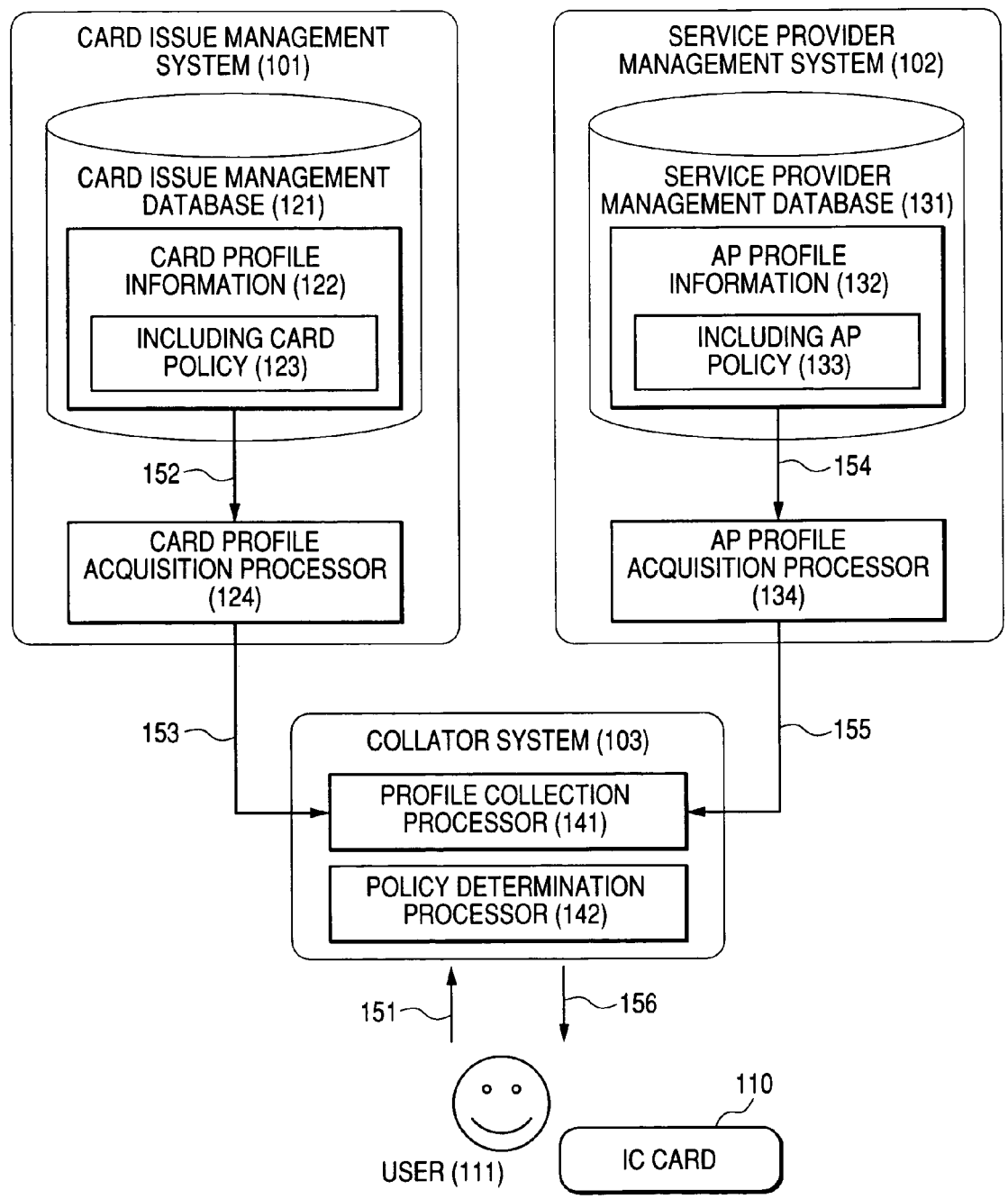
FIG. 1 shows a conventional IC card system configured to determine whether an AP can be loaded or not.

An invention for an integrated circuit card system and an application loading method is disclosed. Numerous specific details are set forth in order to provide a thorough understanding of the present invention. It will be understood, however, to one skilled in the art, that the present invention may be practiced with other specific details.

An embodiment of the invention will be concretely described below. A description is given below of a process for determining whether an application program (AP) can be loaded or not into an integrated circuit (IC) card system. The process is executed using solving methods in linkage among a card issue management system, a service provider management system and a collator system.

As preparation, the card issue management system and the service provider management system prepare a mapping rule between a public definition format and the existent information managed in each database (DB) owned by themselves. The definition format means the format definition of the notation of profile information. For example, if profile information is described in extensible markup language (XML), document type definition (DTD) and XML schema definition are the definition format. As different systems of the card issue management system and the service provider management system provide profile information owned by each, notation according to a common format is required. As the definition format is not necessarily uniform amongst all systems, the definition format must be specified in a policy provided by each system. Therefore, the definition format is required to be able to be dynamically accessed by plural systems. It is assumed that the definition format is open to the public on a Web server and other similar apparatus.

Mapping rule information means information in which a mapping rule between a public definition format and card attribute existent information is described. As it is assumed that plural definition formats are open to the public, plural mapping rule information items are accordingly prepared. As many mapping rules as definition formats are required. In a case having only one definition format, one definition format may be managed as a file. However, in a case having plural definition formats, data that can be uniquely specified, such as definition format identfication (ID) and uniform resource locator (URL), the definition format of which is open to the public may be stored in a DB as a key.

Next, a policy acquisition process by the collator system will be described. A user requests the collator system to determine whether an AP can be loaded or not. The collator system acquires information for identifying a card, such as card ID from an IC card owned by the user. The collator acquires information for identifying an application program (AP) such as application identification (AID) of an AP which the user desires to be loaded. The collator system specifies the card ID and requests the corresponding card policy of the card issue management system. The collator system then specifies the AID and requests the corresponding AP policy of the service provider management system.

Next, a card policy transmission process by the card issue management system will be described. The card issue management system stores the corresponding card policy in the DB using the specified card ID as a key. Heretofore, the card policy is managed in the DB as a part of card profile information. However, the card policy is stored in the DB as independent information. The card issue management system extracts the card policy corresponding to the card ID and transmits it to the collator system.

In an AP policy transmission process by the service provider management system, an AP policy is similarly managed in the DB independent of application profile information. The AP policy corresponding to the AID specified by the collator system is extracted from the DB and is transmitted to the collator system.

Next, a profile acquisition process by the collator system will be described. The collator system analyzes contents of the acquired card policy and the acquired AP policy and extracts items of profile information required for determining the policy. The collator system specifies the necessary card profile item and a definition format specified by the policy and requests a card profile of the card issue management system. The collator system similarly specifies the required AP profile item and a definition format specified by the policy and requests an AP profile of the service provider management system. In this case, the definition format of the card profile and the definition format of the AP profile are not required to be the same.

Next, a card profile transmission process by the card issue management system will be described. The card issue management system checks to the specified definition format. The card issue management system selects a mapping rule between the specified definition format and a card attribute existent information DB owned by itself, checks to which item in the DB the required profile information item is equivalent according to the rule, and then extracts a value. Next, the card issue management system creates card profile information based upon the extracted value according to the specified definition format and then transmits the card profile information to the collator system.

An AP profile transmission process by the service provider management system is described here. The service provider management system checks the specified definition format. The service provider management system selects a mapping rule between the specified definition format and AP attribute existent information DB owned by itself, checks to which item in the DB the required profile information item is equivalent according to the rule, and then extracts a value. The service provider management system then creates AP profile information based upon the extracted value according to the specified definition format and transmits it to the collator system.

Next, a policy determination process by the collator system will be described. The collator system determines whether the card policy is met or not using the acquired card policy and the profile information required for determination. The collator system similarly determines whether the AP policy is met or not using the acquired AP policy and the profile information required for determination. After all policy determination is finished, the collator system presents the result to the user.

Figure 2:
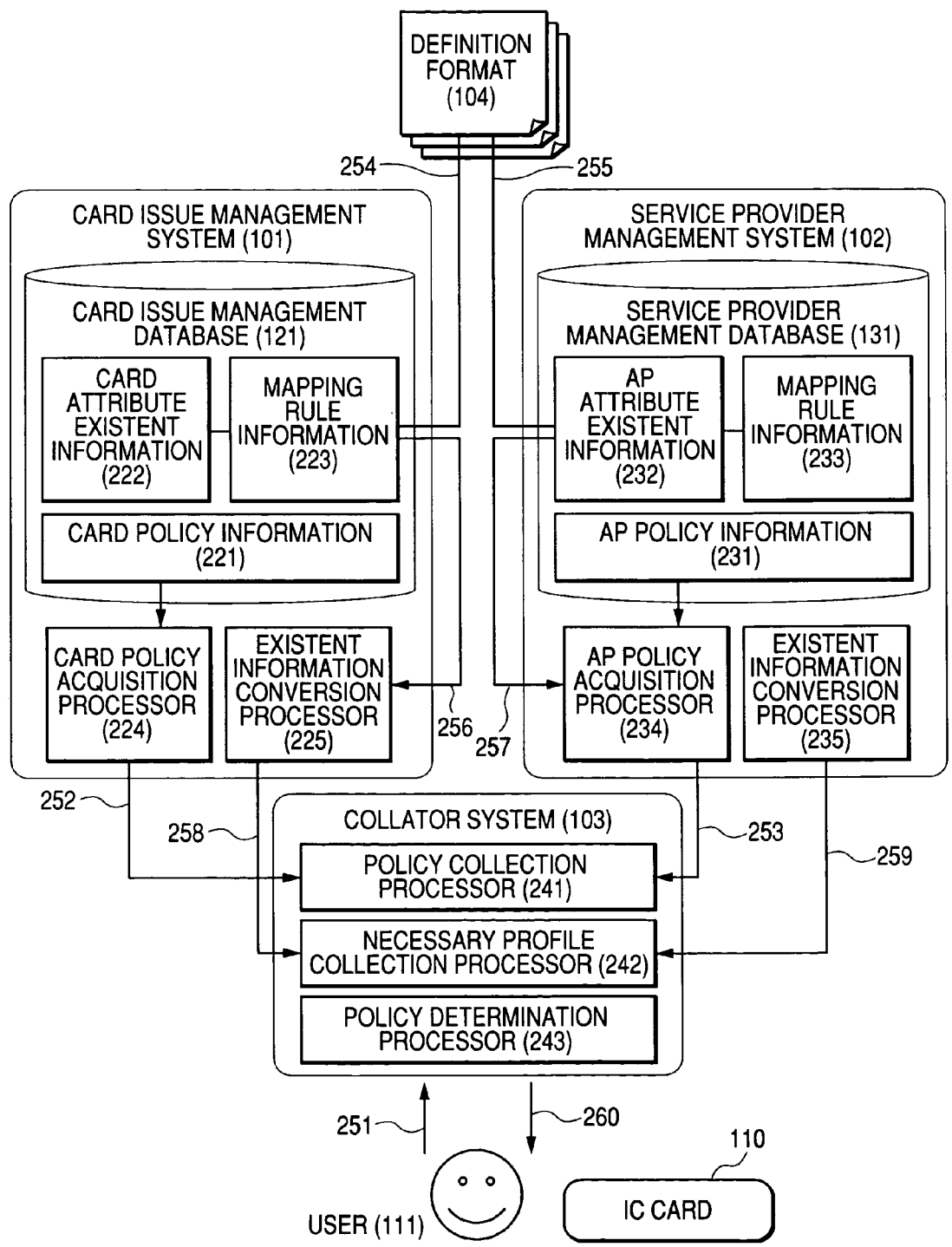
FIG. 2 shows a system configuration for enabling a method of determining whether an AP can be loaded or not by independently managing a policy and a profile and dynamically creating a profile based upon an existing DB, in accordance with an embodiment of the present invention.

FIG. 2 shows the basic configuration of systems of the present invention. The card issue management system 101 manages information related to the IC card and the information of the card user and executes card issue service. In one example, information related to the IC card means card ID, the capacity (ROM, EEPROM, RAM) of the card, the type and the version of card OS, and card status information including the list information of loaded Aps. In one example, information of the card user means the name, the age, the distinction of sex, the address, the phone number and the history information of the user.

The card issue management system 101 manages a card issue management database 121 and in the DB, card policy information 221, card attribute existent information 222 and mapping rule information 223 are managed.

The card policy information 221 is a requisite which the card requests of another entity such as AP. For example, the card policy information is that the capacity of the AP shall be 4 KB or less, the type of the AP shall be an AP corresponding to JavaCard, the annual income of the user shall exceed a fixed condition, and the age of the user shall exceed a fixed condition.

Card attribute existent information 222 means profile information related to the card that has been managed by card issue management system 101. Card attribute existent information 222 may include basic data, such as card ID, card capacity, the type, and the version of card OS. Card attribute existent information 222 may also include data that dynamically varies, such as card status information, including the list information of APs currently loaded into the card.

Mapping rule information 223 means information describing a mapping rule between a definition format 104 open to the public and card attribute existent information 222. As it is assumed that plural definition formats 104 are open to the public, plural mapping rule information items are accordingly prepared.

A card policy acquisition processor 224 is provided with logic for returning the corresponding card policy in response to a request from an external system.

An existent information conversion processor 225 is provided with the following logic. The existent information conversion processor 225 retrieves mapping rule information corresponding to a specified definition format in response to a card profile request that requests card profile information from the external system. Next, the existent information conversion processor extracts card attribute existent information 222 corresponding to a requested profile item according to a mapping rule. The card profile information is a generic name of attribute information related to the card. Card profile information includes basic data, such as card ID, card capacity, the type and the version of card OS. Card profile information also includes data that dynamically varies, such as card status information, including the list information of APs currently loaded in the card. The existent information conversion processor 225 creates a card profile by finally converting the extracted information according to the definition format and transmits it to the collator system 103.

A card issue management system provider has the commitment of IC card issue service and executes IC card issue service using the card issue management system 101, as revised by the present invention. Examples of a card issue management system provider include a credit card issuance company, a bank, a local government, a department store, and public transport. The card issue management system 101 may be installed in a service center of each company. The card issue management system 101 may be installed in a center of an arbitrary service operation company commissioned by each company.

The card issue management system 101 is realized by a server, the card issue management database 121 is realized by a DB in a hard disk drive (HDD), and processors 224, 225 are operated according to a computer program installed in an application server in the HDD.

The service provider management system 102 manages information related to an AP and the information of a service user and provides service. The service provider management system 102 manages a service provider management database 131. In the DB, AP policy information 231, AP attribute existent information 232, and mapping rule information 233 are managed.

The AP policy information 231 is a requisite requested of another entity such as a card by an AP. For example, the AP policy information 231 is that the EEPROM capacity of a card shall be 16 KB or more, that the platform of the card shall be Java®Card, that the type of the card shall be a gold card, and that the age of the user shall meet a certain condition.

The AP attribute existent information 232 means attribute information related to the AP that has been managed by the service provider management system 102. The AP attribute existent information 232 may include basic data, such as AID, the name, the version, the capacity and the type of the AP. The AP attribute existent information 232 may also include data that dynamically varies such as the AP status information including whether the AP is run or not are included.

The mapping rule information 233 means information describing a mapping rule between the definition format 104 open to the public and the AP attribute existent information 232. As it is supposed that plural definition formats 104 are open to the public, plural mapping rule information items are accordingly prepared.

An AP policy acquisition processor 234 is provided with logic for returning the corresponding AP policy in response to a request from an external system.

An existent information conversion processor 235 is provided with the following logic. The existent information conversion processor 235 retrieves mapping rule information corresponding to a specified definition format in response to a request for an AP profile from an external system. Next, the existent information conversion processor 235 extracts AP attribute existent information corresponding to a requested profile item according to a mapping rule. The existent information conversion processor 235 then converts the extracted information according to the definition format, creates an AP profile, and transmits the AP profile to the collator system.

A service provider management system provider has the commitment of service for loading or deleting an AP and the operation of service. The provider executes service for loading or deleting an AP using the service provider management system 102. Examples of a service provider management system provider include an operation manager of a point-of-sale AP, an electronic money operation manager, and the operation manager of an entertainment AP, such as a video game. The service provider management system may be installed in service centers of companies. The service provider management system may also be installed in a center of an arbitrary service operation company commissioned by companies.

The service provider management system 102 is realized by a server. The service provider management database 131 is realized by a DB in a HDD. Processors 234, 235 are operated according to a computer program installed in the application server in the HDD.

The collator system 103 is a system for collecting the policy and a profile required for determining the policy in response to a request of the user 111 and determining whether the policy is met or not. The collator system 103 is provided with a policy collection processor 241, a necessary profile collection processor 242 and a policy determination processor 243.

The policy collection processor 241 is provided with logic for requesting and acquiring the card policy of the card issue management system 101, and for requesting and acquiring the AP policy of the service provider management system 102.

The necessary profile collection processor 242 is provided with logic for analyzing the contents of the acquired policy, extracting an item of profile information required for determining the policy, and requesting and acquiring the profile information. The necessary profile collection processor 242 transmits the necessary card profile information item and a definition format specified by the policy to the card issue management system 101 and then receives the corresponding card profile. The necessary profile collection processor 242 transmits the necessary AP profile information item and a definition format determined by the policy to the service provider management system and receives the corresponding AP profile. The policy determination processor 243 is provided with logic for analyzing the acquired profile, determining whether the card policy and the AP policy are met or not, and presenting the result to the user.

A collator system provider has the commitment of determination service using the policy and the profile, and executes determination service using the collator system 103. The collator system provider may be a provider dedicated to newly supposed collation service. However, the card issue management system provider may execute determination service when a card is issued. The service provider management system provider may execute determination service when an AP is loaded. Accordingly, the collator system 103 may be installed in a service center of the collator system provider. The collator system may also be installed as a part of the card issue management system or as a part of the service provider management system.

The collator system 103 is realized by a server. Processors 241, 242, 243 are operated according to a computer program installed in the application server in HDD. The collator system 103 requires the IC card reader/writer to acquire card profile information, such as card ID, from an IC card. However, it is assumed that connectors of the reader/writer may be different depending upon the usage of a user. For example, if the home PC of a user is connected to the collator system via the Internet, the reader/writer is installed in the home PC. If a user visits a shop of the collator system provider and utilizes service, the reader/writer are installed in a terminal installed in the shop.

A definition format 104 is a format for a card profile and an AP profile to follow. Plural definition formats exist and can be freely selected when a policy is created. A policy creator can also create a definition format. However, these definition formats are open to the public and must be freely accessible to plural external providers, including a profile provider such as the card issue management system provider and the service provider management system provider.

The definition format is typically installed in a Web server and may be accessed with a URL. There may also be a provider dedicated only to the management service of a definition format. However, the card issue management system provider and the service provider management system provider or the collator system provider may often create, publish and manage a definition format.

The card issue management system 101, the service provider management system 102 and the collator system 103 exchange information via a network such as a public network, via a network including a common carrier leased line, or via mailing or handing a document and an information record medium. The terminal and the server of each system exchange information via a public network or via a network including a leased line.

Next, a rough procedure for determining whether an AP can be loaded or not according to a method proposed in the embodiment of the invention will be described.

A process for determining whether an AP can be loaded or not is started in response to a request to determine whether an AP can be loaded or not from the user 111. However, there is a process to be executed for preparation. This process involves preparing mapping rule information 223, 233. The mapping rule information 223, 233 is information showing a relationship between the definition format 104 open to the public and attribute existent information 222, 232 owned by each system.

When the above-mentioned preparation is finished, the process for determining whether an AP can be loaded or not can be executed. The user 111 who desires an AP to be loaded into the IC card accesses the collator system and requests it to be determined whether or not the AP desired to be loaded can be loaded into the IC card 110 owned by the user (step 251). Examples of a request method include accessing the Web access from a home PC, accessing the Web from a terminal installed in a shop, and calling an operator by telephone.

The collator system 103 first executes policy acquisition processing. The collator system 103 acquires the corresponding card policy from the card issue management system using a card ID of the card owned by the user or a card type related to the card ID as a key (step 252).

Similarly, the collator system 103 acquires the corresponding AP policy from the service provider management system 102 using AID of the AP which the user desires to be loaded or an AP type related to AID as a key (step 253).

Next, a profile acquisition process will be described. The collator system 103 analyzes the acquired policy and extracts an item of card profile information required for determining the policy and an item of AP profile information required for determining the policy. For example, when the card policy is that the capacity of the AP shall be 4 KB or less, a necessary item of AP profile information is the capacity of the AP. Similarly, for example, when the AP policy is that the EEPROM capacity of the card shall be 16 KB or more, a necessary item of card profile information is the EEPROM capacity of the card.

The collator system 103 specifies the necessary items of profile information and the definition format 104 specified by the policy, requests a card profile of the card issue management system 101 and requests an AP profile of the service provider management system 102. The card issue management system 101 first refers to the specified definition format (step 254), retrieves the corresponding mapping rule information 223, extracts requested information from the card attribute existent information 222 according to the mapping rule information, and transmits the information to the existent information conversion processor 225 (step 256). The card issue management system then converts information extracted in the existent information conversion processor according to the definition format and transmits it to the collator system (step 258). The service provider management system 102 similarly refers to a specified definition format (step 255), retrieves the corresponding mapping rule information 233, extracts requested information from the AP attribute existent information 232 according to the mapping rule information, and transmits the information to the existent information conversion processor 235 (step 257). The service provider management system 102 then converts information extracted in the existent information conversion processor 235 according to the definition format and transmits it to the collator system 103 (step 259).

Next, a policy determination process will be described. The collator system 103 determines a card policy and an AP policy using the acquired policy and profiles required for determination. The collator system 103 finishes the determination of all policies, presents the result to the user (step 260), and finishes the process for determining whether an AP can be loaded or not. The user reconsiders and selects an AP which the user desires to be loaded based upon the result of determination. A process for actually loading the AP is started. However, even if the user desires an AP the loading of which is rejected as a result of the determination again, the AP will not be loaded.

FIG. 11 shows an example notation of a policy, in accordance with an embodiment of the present invention. The card policy is represented here in XML. The contents of the policy are that nonvolatile capacity, which an AP requires, shall be 4000 bytes or less and that the type of the AP shall be an application program.

FIG. 12 shows an example of an AP profile represented in XML like the policy, in accordance with an embodiment of the present invention. The type of the AP, volatile capacity which the AP requires, nonvolatile capacity which the AP requires, and a parameter when the AP is installed are described as an item.

When the profile is generated, the profile can be dynamically generated from existing DBs 222, 232, shown in FIG. 2, using mapping rule information 223, 233, shown in FIG. 2. In the case of the profile example shown in FIG. 12, one example of the mapping rule information 223, 233 is a mapping table of an XPATH character string showing each element of XML data shown in FIG. 12 and a table column name of the existing DB.

FIG. 13 shows the data structure of a DB for managing a policy, in accordance with an embodiment of the present invention. In the case of a card policy, information concretely showing a policy ID and the card policy is managed using a card ID as a key 1301. It is equivalent to the card policy information 221 in FIG. 2.

In the case of an AP policy, information concretely showing the policy ID and the AP policy is managed using AID as a key 1302. It is equivalent to the AP policy information 231 in FIG. 2.

The policy ID is an ID for identifying a policy. If a card is uniquely limited, the corresponding card policy is also limited to one. However, it is assumed that the card policy is not different for every card but plural cards often refer to the same card policy. Circumstances are also similar with respect to the AP policy and AID.

Figure 3:
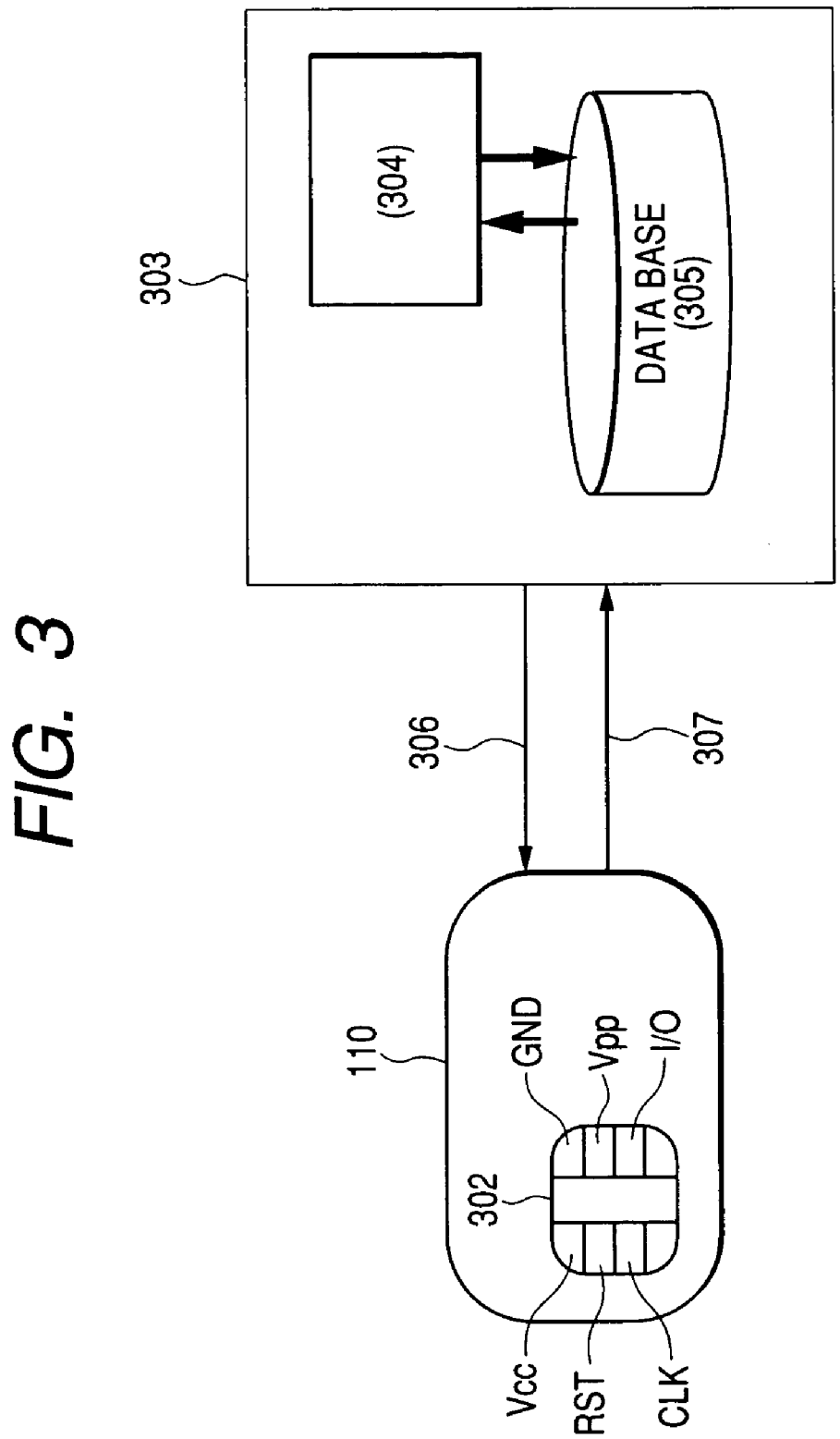
FIG. 3 shows the outline of a card system, in accordance with an embodiment of the present invention.

FIG. 3 shows an outline of an example IC card system, in accordance with an embodiment of the present invention. The IC card 110 includes a chip 302. In this example, the IC chip 302 exchanges data with reader/writer 303 (or a terminal provided with reader/writer). The reader/writer 303 includes a control processor 304 and a magnetic disk 305 to be a database. IC card 110 includes Vcc (a power supply terminal), GND (a ground terminal), RST (a reset terminal), I/O (an input/output terminal) and CLK (a clock terminal). An inquiry 306 may occur concerning a card ID and others from the reader/writer 303 to the IC card 110. The IC card 110 may make a response 307 to the inquiry 306. Such transmission of various information is fully achieved by a normal system.

The application program is loaded into a memory region concretely in the IC chip 302 in the IC card 110. Examples of the memory that may be used include a random access memory (RAM), an electrical erasable programmable read only memory (EEPROM), and a read only memory (ROM).

Figure 4:
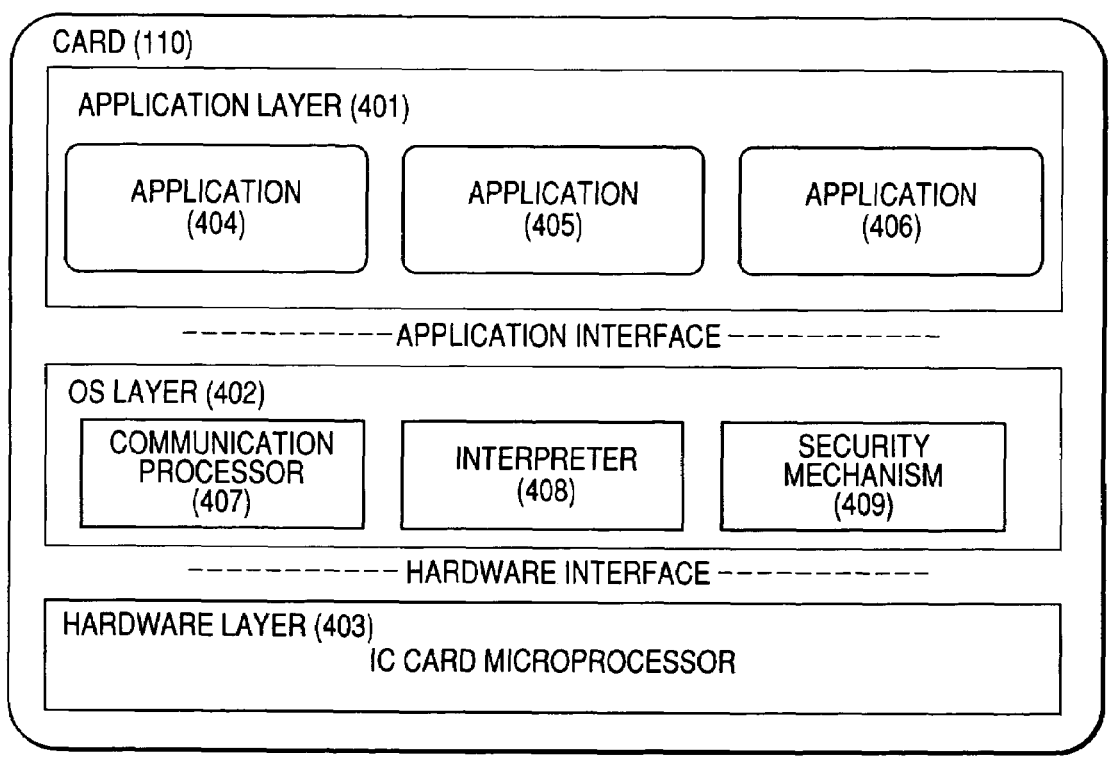
FIG. 4 shows the basic configuration of an IC card, in accordance with an embodiment of the present invention.

FIG. 4 shows the logical configuration of a basic region inside an IC in the IC card 110, in accordance with an embodiment of the present invention. The IC includes hardware layer 403, an OS layer 402, which is a region into which an operating system (OS) is loaded, and an application layer 401, which is a region into which an application program is loaded. Plural application programs 404 to 406 can be loaded into the application layer 401. Application program initial loading means that the application programs 404 to 406 are distributed to an applicant of use in a state in which the application programs are already loaded when the IC card is issued. Dynamic loading means that these application programs 404 to 406 can be loaded or deleted after the card is issued. These application programs 404 to 406 are managed by the service provider management system 102 shown in FIG. 2. Information related not only to the body of the application programs but also to AID and AP size is stored in the AP attribute existent information 232 in the DB 131. The OS layer 402 is provided with a communication processor 407, an interpreter 408 and a security mechanism 409, receives a command from an external terminal, and transfers a command of the application programs. An application interface is installed between the application layer 401 and the OS layer 402. A hardware interface is installed between the OS layer 402 and the hardware layer 403.

Figure 5:
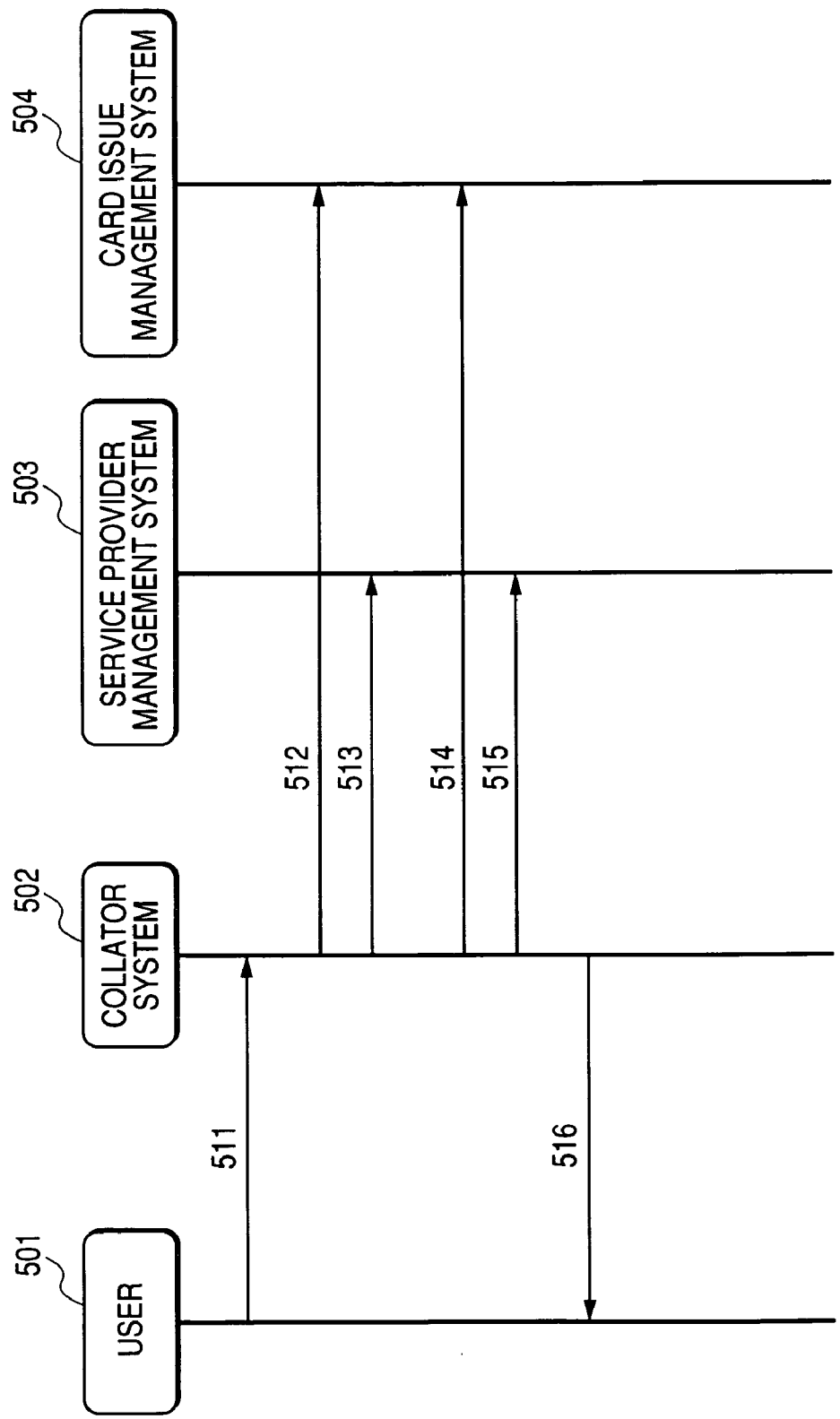
FIG. 5 shows a sequence for determining whether an AP can be loaded or not in response to a request of a user, in accordance with an embodiment of the present invention.

FIG. 5 shows a sequence for determining whether an AP can be loaded or not in response to a request of a user, in accordance with an embodiment of the present invention. A user 501 sends a request 511 to the collator system 502. The request 511 is to determine whether an AP desired to be loaded into the IC card owned by the user can be loaded. The collator system 502 acquires the card ID of the IC card 110, then requests and acquires the corresponding card policy of the card issue management system 504 (step 512). The collator system 502 requests and acquires the corresponding AP policy of the service provider management system 503 using AID of the AP which the user desires to be loaded as a key (step 513).

Next, the collator system 502 analyzes the acquired policy, extracts a necessary item of card profile information, requests and acquires a card profile of the card issue management system 504 (step 514). Similarly, the collator system 502 extracts a necessary item of AP profile information, requests and acquires an AP profile of the service provider management system 503 (step 515). The collator system 502 determines all policies using the acquired policy and the acquired profiles and presents the result to the user 501 (step 516).

The following explains the relationship between each component shown in FIG. 5 and FIG. 2. The user 501 is equivalent to the user 111 shown in FIG. 2. The collator system 502 is equivalent to the collator system 103 shown in FIG. 2. The service provider management system 503 is equivalent to the service provider management system 102 shown in FIG. 2. The card issue management system 504 is equivalent to the card issue management system 102 shown in FIG. 2.

The details of the method of determining whether an AP can be loaded or not in the embodiment of the invention described above will be described using flowcharts of FIGS. 6 to 10, showing each operation of the card issue management system 504, the service provider management system 503 and the collator system 502 below. In these drawings, the sequence shown in FIG. 5 is described in detail.

Figure 6:
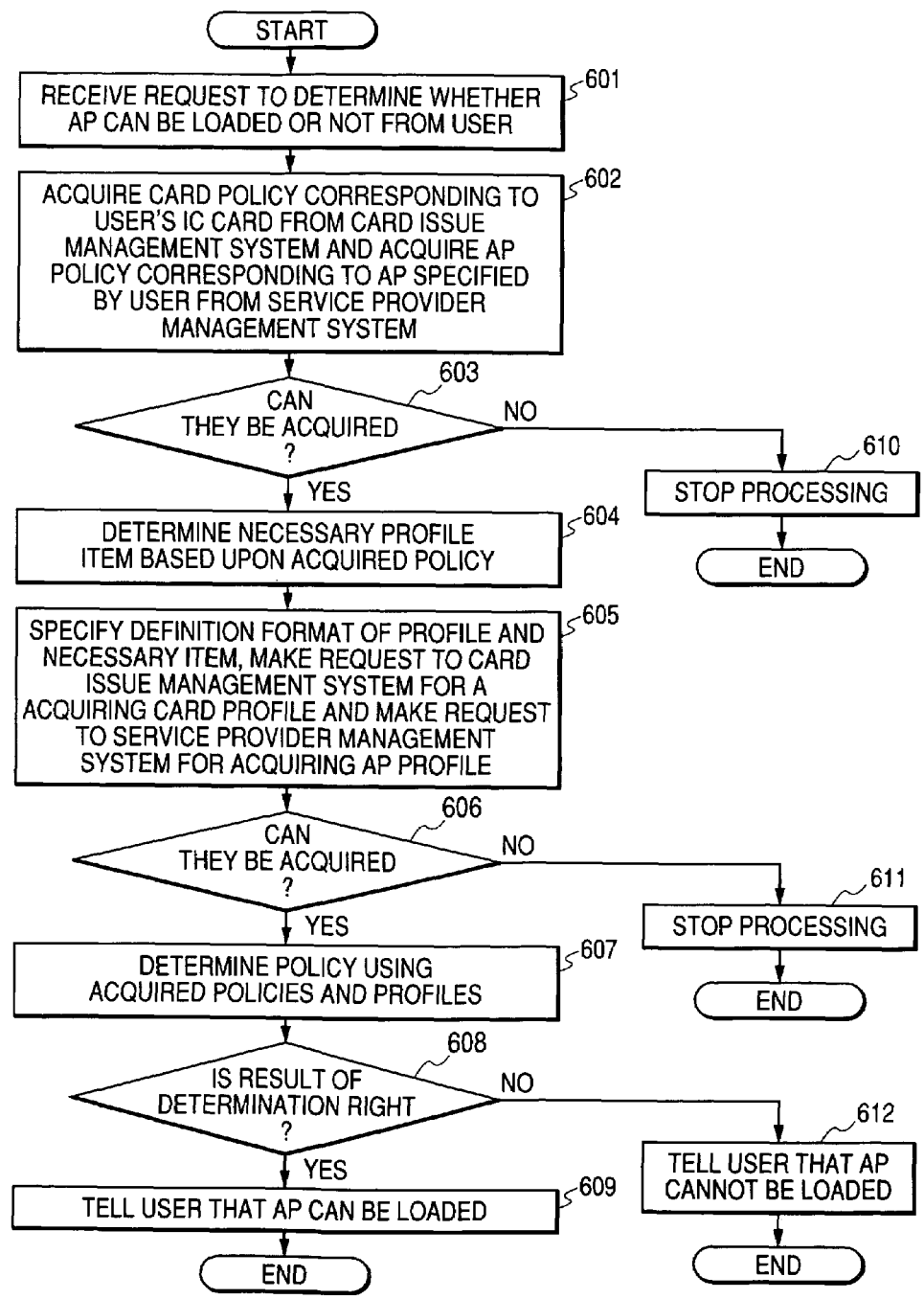
FIG. 6 shows a sequence for a collator system to determine whether an AP can be loaded or not, in accordance with an embodiment of the present invention.

FIG. 6 is a flowchart showing the operation of the collator system in an embodiment of the present invention.

The collator system 502 receives a request to determine whether or not an AP can be loaded from the user (step 601). As described above, an examples of a request method include Web access from a home PC, access from a terminal installed in a shop, and telephone inquiry to an operator. The collator system 502 acquires the card ID of the IC card 110, requests the corresponding card policy of the card issue management system 504, and requests an AP policy corresponding to AID of an AP which the user desires to be loaded of the service provider management system 503 (step 602). Each policy is acquired (step 603). However, as the determination of policies cannot be continued if policies cannot be acquired, the processing is stopped (step 610). If each policy can be acquired, such policies are analyzed and a profile item required for determining policies is determined (a step 604). Next, both the determined card profile item and a definition format which the policy specifies are requested of the card issue management system. Similarly, both the AP profile item and a definition format specified by the policy are requested of the service provider management system 503 (step 605). Each profile is acquired (step 606). However, as the determination of policies cannot be continued if policies cannot be acquired, the processing is stopped (step 611). If each profile can be acquired, a policy is determined using such policies and profiles (step 607). As a result of the determination of all policies (a step 608), it is presented to the user that an AP cannot be loaded if it is determined that the AP cannot be loaded (step 612). If it is determined that the AP can be loaded, it is presented to the user and the processing is finished (step 609).

Figure 7:
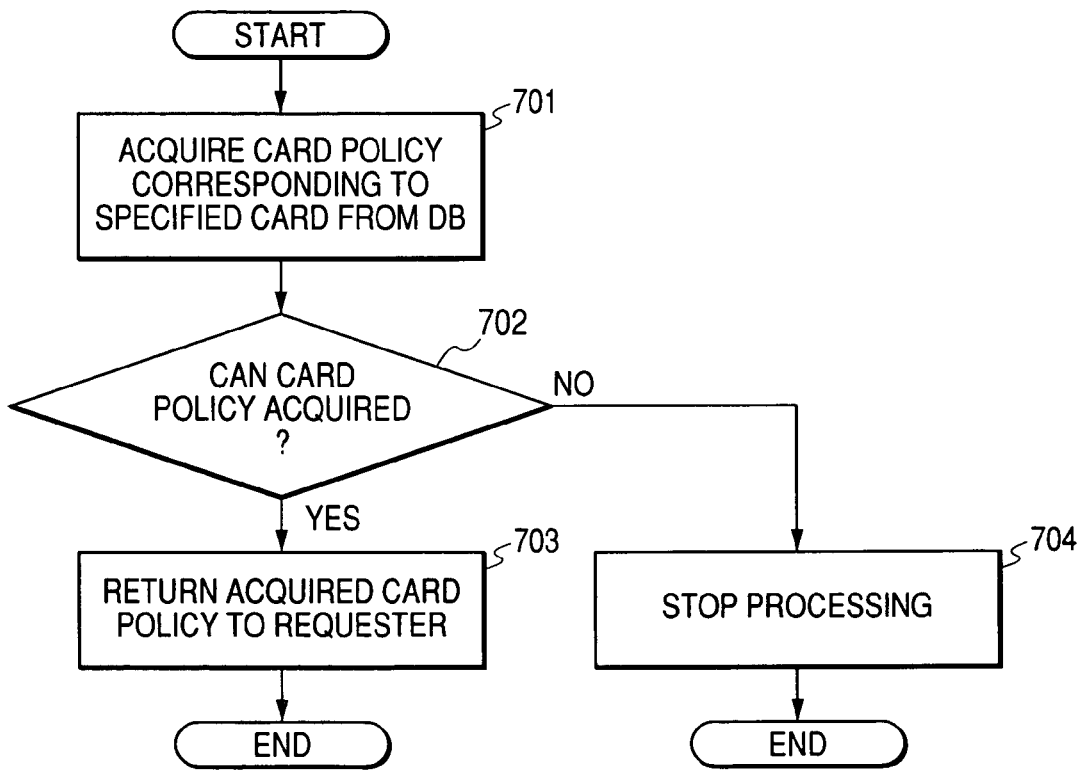
FIG. 7 shows a sequence for a card issue management system to transmit a card policy in response to a request from the collator system, in accordance with an embodiment of the present invention.
Figure 8:
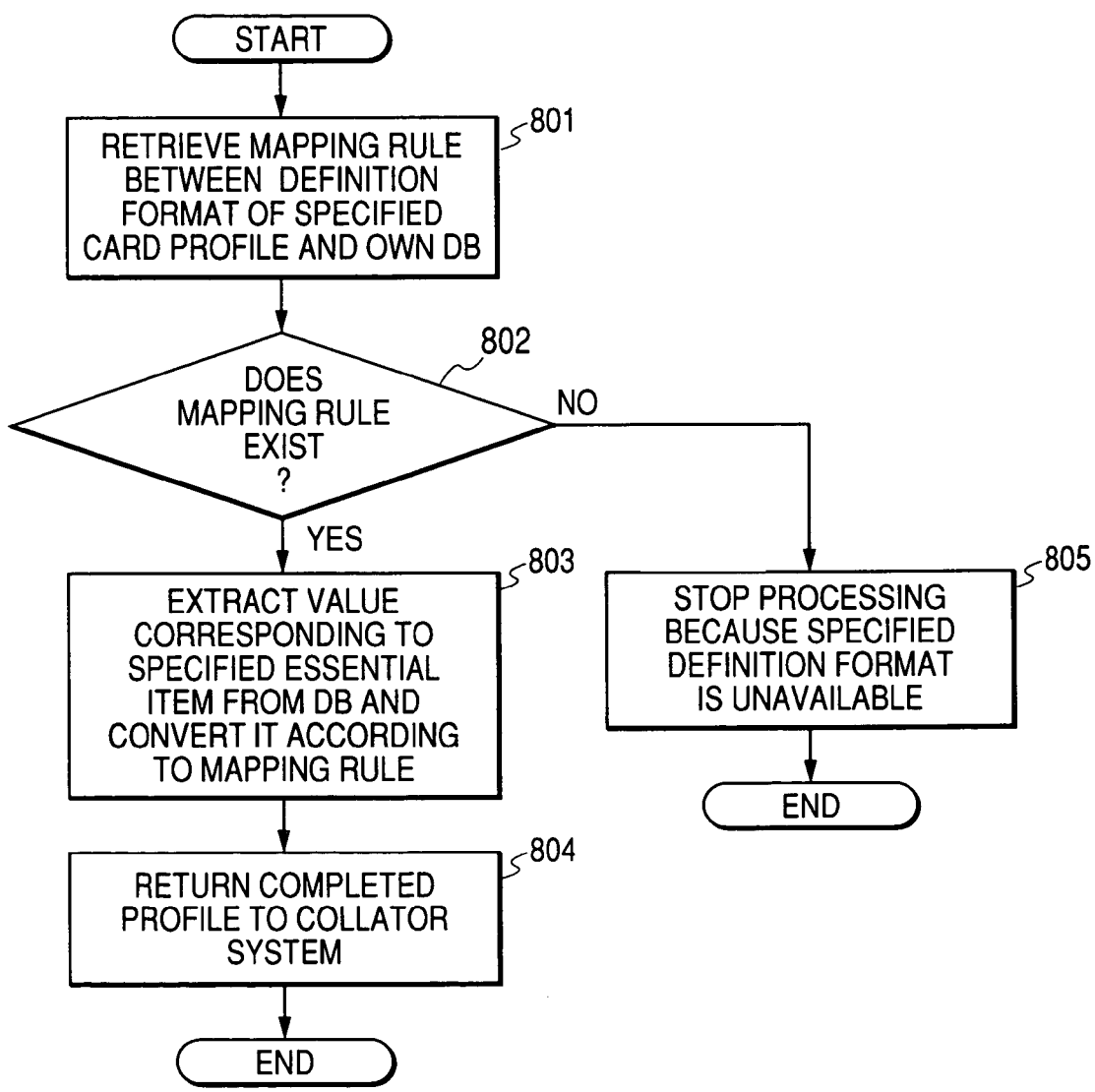
FIG. 8 shows a sequence for the card issue management system to transmit a card profile in response to a request from the collator system, in accordance with an embodiment of the present invention.

FIGS. 7 and 8 are flowcharts showing the operation of the card issue management system 504 in an embodiment of the invention.

Referring to FIG. 7, a card policy transmission process of the card issue management system 504 will be described. The card issue management system 504 acquires a card policy corresponding to the specified card from a DB in response to a request from the collator system 502 (step 701). If the corresponding card policy cannot be acquired as a result of the acquisition process from the DB (step 702), it is presented to the collator system 502 and the processing is stopped (step 704). If the corresponding card policy can be acquired, the card policy is transmitted to the collator system 502 and the processing is finished (step 703).

Next, referring to FIG. 8, a card profile transmission process of the card issue management system 504 will be described. The card issue management system 504 refers to a specified definition format in response to a request from the collator system 502 and retrieves a mapping rule for mapping with its own DB (step 801). As a result of a retrieval process (step 802), because a card profile according to the specified definition format cannot be transmitted if no mapping rule is prepared, the card profile is transmitted to the collator system 502. The processing is then stopped (step 805). If the mapping rule is prepared, a value corresponding to a necessary item of a specified profile is extracted from the DB and is converted to the form of the card profile according to the definition format (step 803). The converted card profile is transmitted to the collator system 502. The processing is then finished (step 804).

Figure 9:
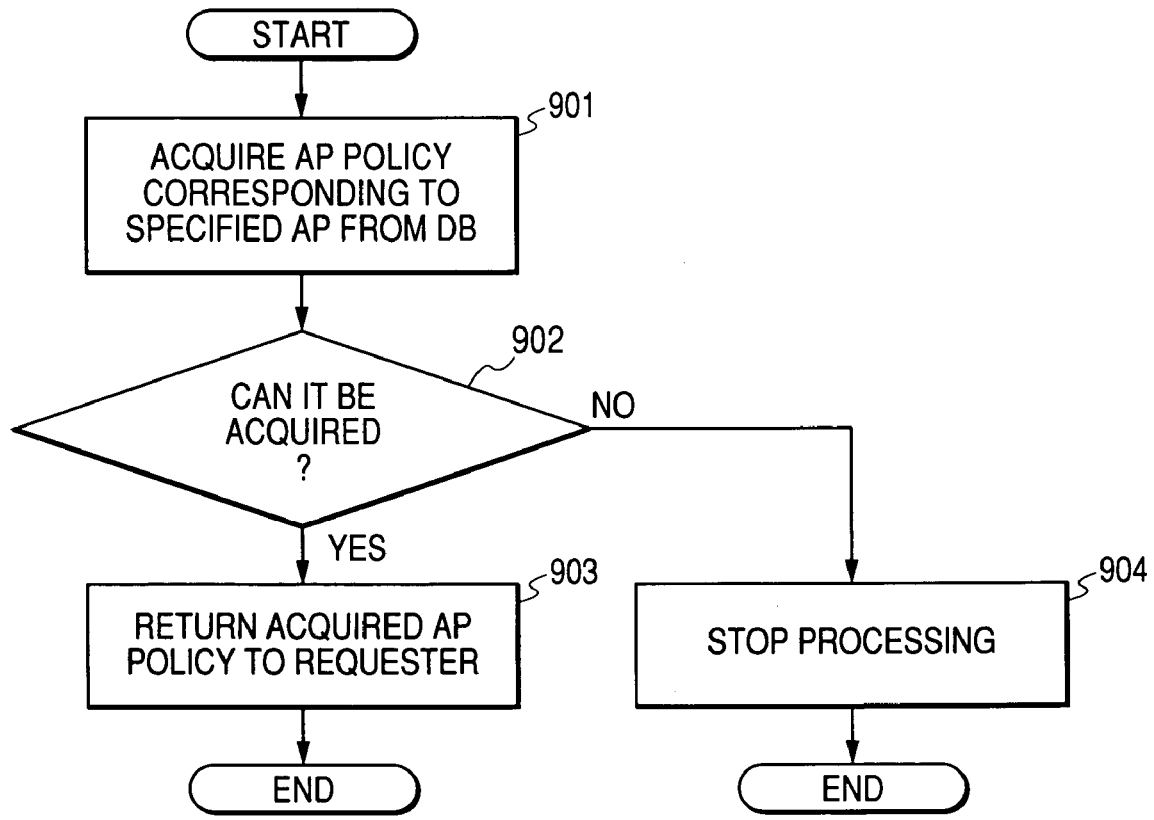
FIG. 9 shows a sequence for a service provider management system to transmit an AP policy in response to a request from the collator system, in accordance with an embodiment of the present invention.
Figure 10:
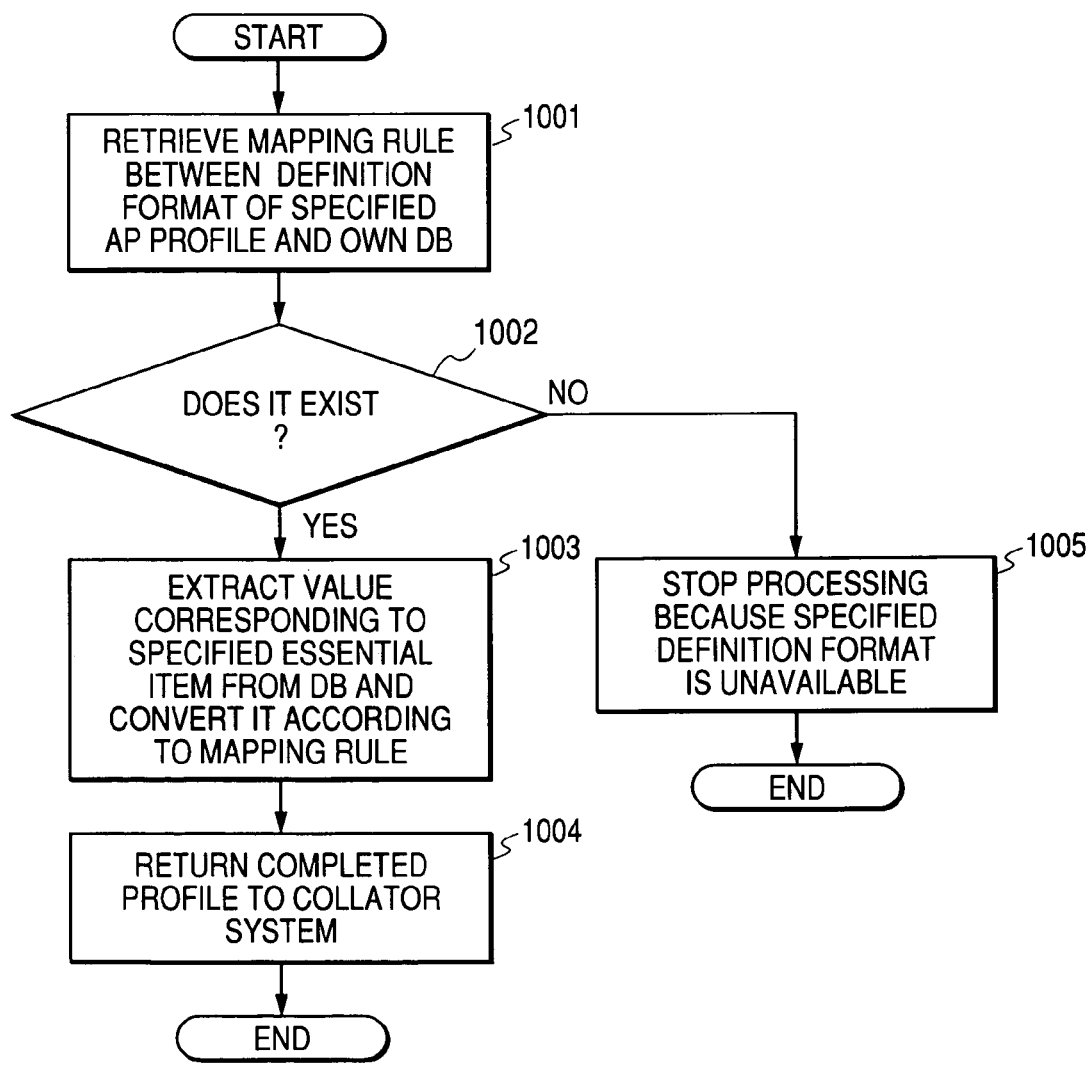
FIG. 10 shows a sequence for the service provider management system to transmit an AP profile in response to a request from the collator system, in accordance with an embodiment of the present invention.

FIGS. 9 and 10 are flowcharts showing the operation of the service provider management system 503 in an embodiment of the invention.

Referring to FIG. 9, an AP policy transmission process of the service provider management system 503 will be described. The service provider management system 503 acquires an AP policy corresponding to a specified AP from the DB in response to a request from the collator system 502 (step 901). As a result of the acquisition process from the DB (step 902), if the corresponding AP policy cannot be acquired, the AP policy is transmitted to the collator system 502 and the processing is stopped (step 904). If the corresponding AP policy can be acquired, the AP policy is transmitted to the collator system 502 and the processing is finished (step 903).

Referring to FIG. 10, an AP profile transmission process of the service provider management system 503 will be described. The service provider management system 503 refers to a specified definition format in response to a request from the collator system 502 and retrieves a mapping rule for mapping with its own DB (step 1001). As a result of the retrieval process (step 1002), because an AP profile according to the specified definition format cannot be transmitted if no mapping rule is prepared, the AP profile is transmitted to the collator system 502 and the processing is stopped (step 1005). If the mapping rule is prepared, a value corresponding to a necessary item of a specified profile is extracted from the DB and is converted to the form of the AP profile according to the definition format (step 1003). The converted AP profile is transmitted to the collator system 502 and the processing is finished (step 1004).

Embodiments of the present invention have been described. The IC card 110 includes a contact type IC card and a non-contact type IC card. However, embodiments of the present invention can be applied independent of the configuration of the IC card 110.

In the card issue management system 504 and the service provider management system 503, information managed in the existing DB can be dynamically converted to a profile. Therefore, a function for determining whether an AP can be loaded, provided by the invention of the existing IC card operation management system, can be executed by adding an existent information conversion function according to a mapping rule and a policy management function. There is also service for enabling a function for determining whether an AP can be loaded, wherein the function is to be executed by adding only necessary functions as described above.

As described above, according to the embodiment of the invention, the following problems are addressed by providing a system that a policy and a profile are independently managed and the profile is dynamically created based upon an existing DB.

One problem is that the collator system 502 is required to acquire all items of profile information. This problem is solved by independently managing a policy of a profile. The collator system 502 acquires a card policy from the card issue management system 504 and acquires an AP policy from the service provider management system 503 if the collator system 502 receives a request to determine whether an AP can be loaded. The collator system 502 analyzes the contents of the acquired policy and requests each profile item required for determination of the card issue management system 504 and the service provider management system. Accordingly, the requested system does not disclose unnecessary information for determining policies outside the system by extracting only the specified profile item and returning it to the collator system. The quantity of data exchanged between the systems can also be minimized.

Another problem is that the format of profile information is fixed. This problem is solved by preparing a profile format called a definition format, dynamically selecting it, and preparing a mapping rule between the definition format and existing DB. The definition format is not the only available fixed format. A format can be selected and specified by a provider for creating policies, and can also be freely created, provided that the format is open to the public and a system that determines policies is publicly available. The collator system 502 requests a necessary profile item of a system that manages the item after the collator system 502 acquires policies. However, at that time, the collator system 502 specifies a definition format described in the policy (or information required for referring to a definition format).

The requested system refers to the specified definition format and refers to a mapping rule with its own existing DB. The mapping rule is prepared by a designer of a DB table and others beforehand. Accordingly, it is recognized to which item in the requested system's DB the requested profile item corresponds by referring to the mapping rule. A value can thereby be returned, and profile information is then provided to an external system by the card issue management system 504 and the service provider management system 503 to determine policies, which can be created according to a dynamically specified definition format without making the format of the profile information the only fixed format.

The profile information provided to the external system described above can be dynamically created utilizing the existing DB of the IC card operation management system already operated as it is.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A collator system configured to be connected to an integrated circuit card via an integrated circuit card reader/writer,
    wherein the collator system is connected to a card issue management system configured to manage information related to the integrated circuit card and execute card issue service,
    wherein the card issue management system includes and manages a card issue management database for storing card policies and card profiles,
    wherein the card profiles are profile information related to the integrated circuit card and the card policies are requisites required to load application programs into the integrated circuit card for the application programs,
    wherein the collator system is further connected to a service provider management system configured to manage information related to the application program and provide application service,
    wherein the service provider management system includes and manages a service provider management database for storing application policies and application profiles,
    wherein the application profiles are profile information related to the application programs and the application policies are requisites required to load the application programs into the integrated circuit card for the integrated circuit card, and
    wherein the collator system is configured to receive a request to load the application program into the integrated circuit card,
    the collator system comprising:
    a policy collection processor configured to request and acquire the card policy from the card issue management system and the application policy from the service provider management system;
    a necessary profile collection processor configured to analyze the acquired card policy, specify necessary card profile items among items of card profile and necessary application profile items among items of application profile, select a first definition format specified by the acquired card policy, transmit the necessary card profile items and the first definition format to the card issue management system and receive a part of the card profile corresponding the necessary card profile items from the card issue management system wherein the necessary profile collection processor is further configured to analyze the acquired application policy, specify necessary application profile items among items of application profile, select a second definition format specified by the acquired application policy, transmit the necessary application profile items and the second definition format to the service provider management system and receive a part of the application profile corresponding the necessary application profile items from the service provider management system; and
    a policy determination processor configured to determine to load the application program into the integrated circuit card by verifying whether the acquired card policy is met or not by use of the part of the application profile and the acquired application policy is met or not by use of the part of the card profile.

2. The collator system according to claim 1,
    wherein the card policy is that application program capacity shall be 4KB or less.

3. The collator system according to claim 1,
    wherein the card policy is either one of a card ID, a card capacity, a card OS type, and a card OS version.

4. The collator system according to claim 1,
    wherein application profile is either one of that a EEPROM capacity of a card shall be 16KB or more, that a card type shall be a gold card, and that an age of a user shall meet a certain condition.

5. The collator system according to claim 1,
    wherein the card profile is either one of an application ID, an application name, an application version, an application capacity and an application type.

6. An integrated circuit card system comprising:
    a collator system configured to be connected to an integrated circuit card via an integrated circuit card reader/writer;
    a card issue management system; and
    a service provider management system,
    wherein the collator system is connected to a card issue management system configured to manage information related to the integrated circuit card and execute card issue service,
    wherein the card issue management system includes and manages a card issue management database for storing card policies and card profiles,
    wherein the card profiles are profile information related to the integrated circuit card and the card policies are requisites required to load application programs into the integrated circuit card for the application programs,
    wherein the collator system is further connected to a service provider management system configured to manage information related to the application program and provide application service, wherein the service provider management system includes and manages a service provider management database for storing application policies and application profiles, wherein the application profiles are profile information related to the application programs and the application policies are requisites required to load the application programs into the integrated circuit card for the integrated circuit card, and wherein the collator system is configured to receive a request to load the application program into the integrated circuit card, the collator system comprising:

a policy collection processor configured to request and acquire the card policy from the card issue management system and the application policy from the service provider management system;

a necessary profile collection processor configured to analyze the acquired card policy, specify necessary card profile items among items of card profile, select a first definition format specified by the acquired card policy, transmit the necessary card profile items and the first definition format to the card issue management system and receive a part of the card profile corresponding the necessary card profile items from the card issue management system wherein the necessary profile collection processor is further configured to analyze the acquired application policy, specify necessary application profile items among items of application profile, select a second definition format specified by the acquired application policy, transmit the necessary application profile items and the second definition format to the service provider management system and receive a part of the application profile corresponding the necessary application profile items from the service provider management system; and a policy determination processor configured to determine to load the application program into the integrated circuit card by verifying whether the acquired card policy is met or not by use of the part of the application profile and the acquired application policy is met or not by use of the part of the card profile 7. The collator system according to claim 6,
wherein the card policy is that application program capacity shall be 4KB or less.

8. The collator system according to claim 6,
wherein the card policy is either one of a card ID, a card capacity, a card OS type, and a card OS version.

9. The collator system according to claim 6,
wherein application profile is either one of that a EEPROM capacity of a card shall be 16KB or more, that a card type shall be a gold card, and that an age of a user shall meet a certain condition.

10. The collator system according to claim 6,
wherein the card profile is either one of an application ID, an application name, an application version, an application capacity and an application type.

* * * * *